US012775142B2

(12) United States Patent
Suzuki et al.

(10) Patent No.: US 12,775,142 B2
(45) Date of Patent: Oct. 27, 2026

(54) OPTICAL ELEMENT BONDING/REINFORCING RESIN COMPOSITION, AND OPTICAL MODULE PRODUCED BY USING THE SAME

(71) Applicant: NITTO DENKO CORPORATION, Ibaraki (JP)

(72) Inventors: Kazuaki Suzuki, Ibaraki (JP); Naoto Konegawa, Ibaraki (JP); Atsushi Yamagishi, Ibaraki (JP); Tadao Okawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 121 days.

(21) Appl. No.: 18/009,068

(22) PCT Filed: Jun. 21, 2021

(86) PCT No.: PCT/JP2021/023348
§ 371 (c)(1),
(2) Date: Dec. 8, 2022

(87) PCT Pub. No.: WO2021/261427
PCT Pub. Date: Dec. 30, 2021

(65) Prior Publication Data

US 2023/0103341 A1 Apr. 6, 2023

(30) Foreign Application Priority Data

Jun. 22, 2020 (JP) ................................ 2020-107047

(51) Int. Cl.
*G02B 6/42* (2006.01)
*C09J 133/08* (2006.01)
*C09J 163/00* (2006.01)

(52) U.S. Cl.
CPC .......... *G02B 6/4239* (2013.01); *C09J 133/08* (2013.01); *C09J 163/00* (2013.01); *G02B 6/4245* (2013.01)

(58) Field of Classification Search
CPC ..... G02B 6/4239; G02B 6/428; G02B 6/4281
See application file for complete search history.

(56) References Cited

U.S. PATENT DOCUMENTS 7,551,811 B2 * 6/2009 Aoki .................... G02B 6/1221 385/14
2004/0067366 A1 4/2004 Gorczyca
(Continued)

FOREIGN PATENT DOCUMENTS

CN 101307183 A 11/2008
CN 105264413 A 1/2016
(Continued)

OTHER PUBLICATIONS

Notification of Transmittal of Translation of the International Preliminary Report on Patentability (Form PCT/IB/338) issued in counterpart International Application No. PCT/JP2021/023348 mailed Jan. 5, 2023, with Forms PCT/IB/373 and PCT/ISA/237. (6 pages).
(Continued)

*Primary Examiner* — Eric Wong
(74) *Attorney, Agent, or Firm* — WHDA, LLP

(57) ABSTRACT

An optical module in which a space between a light emitting portion (or a light receiving portion) (11*a*) of an optical element (11) and an insulating layer (1) of an electric circuit board (E) is filled with a cured product of a light-transmissive resin composition containing a curing agent component including only a non-antimony-containing curing agent (i.e., an optical element bonding/reinforcing resin cured product
(Continued)

(X)) and a junction between the optical element (11) and the electric circuit board (E) is reinforced with the cured product.

6 Claims, 3 Drawing Sheets

(56) References Cited

U.S. PATENT DOCUMENTS

| | | | | |
|---|---|---|---|---|
| 2006/0171627 | A1 | 8/2006 | Aoki et al. | |
| 2013/0207127 | A1 | 8/2013 | Yu et al. | |
| 2013/0264602 | A1* | 10/2013 | Namiki | C09J 9/02 252/514 |
| 2014/0186765 | A1* | 7/2014 | Oonishi | C08G 59/42 430/280.1 |
| 2016/0024294 | A1 | 1/2016 | Tsutsumi et al. | |
| 2016/0116690 | A1* | 4/2016 | Tanaka | G02B 6/1221 385/14 |
| 2019/0064455 | A1 | 2/2019 | Mori et al. | |

FOREIGN PATENT DOCUMENTS

| | | | |
|---|---|---|---|
| JP | 5-32866 | A | 2/1993 |
| JP | 2002-057372 | A | 2/2002 |
| JP | 2010-74124 | A | 4/2010 |
| JP | 2010074124 | A * | 4/2010 |
| JP | 2011-53668 | A | 3/2011 |
| JP | 2016-23250 | A | 2/2016 |
| JP | 2018-95765 | A | 6/2018 |
| JP | 2019-40011 | A | 3/2019 |
| TW | 201447408 | A | 12/2014 |
| WO | 2013147018 | A1 | 10/2013 |
| WO | 2014/196251 | A1 | 12/2014 |

OTHER PUBLICATIONS

International Search Report dated Sep. 7, 2021, issued in counterpart International Application No. PCT/JP2021/023348, w/English translation (5 pages).

Office Action dated Nov. 27, 2024 issued in TW application No. 110122523, with English translation. (22 pages).

Decision of Refusal dated Jun. 3, 2025, issued in counterpart TW Application No. 110122523, with English translation. (17 pages).

Office Action dated Mar. 4, 2025 issued in JP application No. 2022-531963, with English translation. (7 pages).

Office Action dated Jan. 17, 2026, issued in counterpart CN Application No. 202180042180.8, with English translation (26 pages).

Office Action dated May 30, 2026, issued in counterpart CN Application No. 202180042180.8, with English translation. (26 pages).

* cited by examiner

RELATED ART

OPTICAL ELEMENT BONDING/REINFORCING RESIN COMPOSITION, AND OPTICAL MODULE PRODUCED BY USING THE SAME

TECHNICAL FIELD

The present disclosure relates to an optical element bonding/reinforcing resin composition which is used for reinforcing the mounting of an optical element such as a light-emitting element or a light-receiving element on an electric circuit board (a junction between the optical element and the electric circuit board) when the optical element is mounted on the electric circuit board, and an optical module produced by using the resin composition.

BACKGROUND ART

The following opto-electric hybrid board (first conventional example) is proposed as an exemplary optical module including optical elements such as a light-emitting element and a light-receiving element mounted on an optical waveguide. The opto-electric hybrid board includes an electric circuit board having an electric wiring provided on the front surface of an insulating layer, an optical waveguide (including a first cladding layer, a core (optical wiring), and a second cladding layer) provided on the back surface (a surface opposite from the electric wiring formation surface) of the insulating layer of the electric circuit board, and a light-emitting element and a light-receiving element mounted on the electric wiring formation surface in association with opposite end portions of the optical waveguide. In the opto-electric hybrid board, the opposite end portions of the optical waveguide each have a tilt surface tilted by 45 degrees with respect to the length of the core (with respect to a light propagating direction), and a core portion located on the tilt surface serves as a light reflection surface (mirror). Further, the Insulating layer is light-transmissive, so that light can propagate through the insulating layer between the light-emitting element and the light reflection surface at one of the opposite ends of the optical waveguide and between the light-receiving element and the light reflection surface at the other end of the optical waveguide.

In the opto-electric hybrid board, light propagates in the following manner. First, light is emitted from the light-emitting element toward the light reflection surface at the one end of the optical waveguide. The light passes through the insulating layer and then through the first cladding layer at the one end of the optical waveguide to be reflected on the light reflection surface of the core at the one end (with the optical path deflected by 90 degrees), and travels through the inside of the core longitudinally of the core. Then, the light traveling through the inside of the core is reflected on the light reflection surface of the core at the other end (with the optical path deflected by 90 degrees), and travels toward the light-receiving element. Subsequently, the light passes through the first cladding layer at the other end to be outputted from the optical waveguide, and then passes through the insulating layer to be received by the light-receiving element.

However, the light emitted from the light-emitting element is diffused and reflected before reaching the light-receiving element. This problematically reduces the effective light propagation amount, thereby reducing the output of the opto-electric hybrid board. To cope with this, various proposals have been made (see, for example, PTL 1). For example, the optical module of the first conventional example is modified such that a lens is provided between the optical waveguide and the optical element such as the light-emitting element or the light-receiving element for reduction of a light propagation loss (second conventional example).

RELATED ART DOCUMENT

Patent Document

PTL 1: JP-A-2019-40011

SUMMARY

However, in the lens as per the second conventional example, the optical module has a complicated structure. Further, the production process for the optical module is complicated with an increased number of components. This poses a cost problem, requiring further improvement.

Therefore, the inventors of the present disclosure contemplated the use of a light-transmissive resin composition essentially containing an epoxy resin for underfilling the optical element such as the light-emitting element or the light-receiving element in the optical module of the first conventional example. That is, the inventors made an attempt to simplify the structure and the production process, to reduce the light propagation loss, and to reinforce a junction between the optical element and the electric circuit board by filling a space between a light-emitting portion or a light-receiving portion of the optical element and the insulating layer of the electric circuit board with the light-transmissive resin composition.

However, the optical module actually produced in the aforementioned manner suffered from the blackening of an underfill around the light-emitting portion and the light-receiving portion of the optical element during prolonged use of the light module, whereby the light emission and the light reception were inhibited. This phenomenon reduced the output of the optical module.

In view of the foregoing, the present disclosure provides an optical element bonding/reinforcing resin composition, and an optical element produced by using the resin composition, which can solve the blackening problem which may otherwise occur when the conventional light-transmissive resin composition is used in contact with the light-emitting portion or the light-receiving portion of the optical element and can solve the output reduction problem which may otherwise occur when the light emission and the light reception of the optical element are inhibited due to the blackening.

The inventors of the present disclosure conducted intensive studies to solve the problems described above. In the study, the inventors found that the blackening problem occurring when the conventional light-transmissive resin composition is used in contact with the light-emitting portion or the light-receiving portion of the optical element is attributable to an antimony-containing curing agent generally used as a curing agent component for the light-transmissive resin composition (particularly, a curing agent component for the epoxy resin). That is, as a result of the study, the inventors revealed that, as shown in FIG. 5, $SbF_6^-$ ions from the antimony-containing curing agent contained in the cured product Y of the light-transmissive resin composition are attracted (in an arrow direction in FIG. 5) to a light-emitting portion (or a light-receiving portion) 11*a* of an optical element 11 charged to a + (plus) polarity to be thereby segregated (due to ion migration), and the segregation appears as the blackening. Thus, the inventors found that the intended purpose can be achieved by using only a non-antimony-containing curing agent, unlike the conventional art, as the curing agent component for the light-transmissive resin composition to be used in the aforementioned application.

That is, the features of the present disclosure are the following [1] to [11].

[1] An optical element bonding/reinforcing resin composition to be used in contact with a light-emitting portion or a light-receiving portion of an optical element while reinforcing a junction between the optical element and an electric circuit board is provided, which comprises a light-transmissive resin composition which includes a resin component and a curing agent component including only a non-antimony-containing curing agent.

[2] In the optical element bonding/reinforcing resin composition according to [1], the resin component of the light-transmissive resin composition contains not less than 50 wt. % of an epoxy resin.

[3] In the optical element bonding/reinforcing resin composition according to [2], the resin component of the light-transmissive resin composition further contains an acrylic resin.

[4] In the optical element bonding/reinforcing resin composition according to any one of [1] to [3], the non-antimony-containing curing agent is a phosphorus-containing curing agent.

[5] In the optical element bonding/reinforcing resin composition according to any one of [1] to [3], the non-antimony-containing curing agent is a boron-containing curing agent.

[6] In the optical element bonding/reinforcing resin composition according to any one of [1] to [3], the non-antimony-containing curing agent is an amine curing agent.

[7] In the optical element bonding/reinforcing resin composition according to any one of [1] to [6], the light-transmissive resin composition has at least one property selected from the group consisting of an ultraviolet curable property and a thermosetting property.

[8] An optical module is provided, which includes an electric circuit board, an optical element joined onto the electric circuit board, and an optical element bonding/reinforcing resin cured product provided in contact with a light-emitting portion or a light-receiving portion of the optical element while reinforcing a junction between the optical element and the electric circuit board, wherein the optical element bonding/reinforcing resin cured product is a cured product of the optical element bonding/reinforcing resin composition according to any one of [1] to [7].

[9] In the optical module according to [8], the optical element is joined onto the electric circuit board with the light-emitting portion or the light-receiving portion thereof facing toward the electric circuit board, and the optical element bonding/reinforcing resin cured product serves as an underfill for the optical element.

[10] In the optical module according to [8], the optical element is joined onto the electric circuit board with the light-emitting portion or the light-receiving portion thereof facing away from the electric circuit board, and the optical element bonding/reinforcing resin cured product serves as an encapsulant for the optical element.

[11] The optical module according to any one of [8] to further includes an optical waveguide including a core which is optically coupled to the light-emitting portion or the light-receiving portion of the optical element.

As described above, the optical element bonding/reinforcing resin composition of the present disclosure comprises the light-transmissive resin composition which includes the curing agent component including only the non-antimony-containing curing agent, thereby making it possible to solve the blackening problem which may otherwise occur when the conventional light-transmissive resin composition is used in contact with the light-emitting portion or the light-receiving portion of the optical element, and to solve the light emission/light reception inhibition problem which may otherwise occur due to the blackening.

The optical module of the present disclosure includes the electric circuit board, the optical element joined onto the electric circuit board, and the optical element bonding/reinforcing resin cured product provided in contact with the light-emitting portion or the light-receiving portion of the optical element while reinforcing the junction between the optical element and the electric circuit board, wherein the optical element bonding/reinforcing resin cured product is the cured product of the specific optical element bonding/reinforcing resin composition described above. This makes it possible to solve the blackening problem which may otherwise occur during prolonged use, and to solve the optical module output reduction problem which may otherwise occur due to the blackening phenomenon.

DESCRIPTION OF EMBODIMENTS

Figure 1:
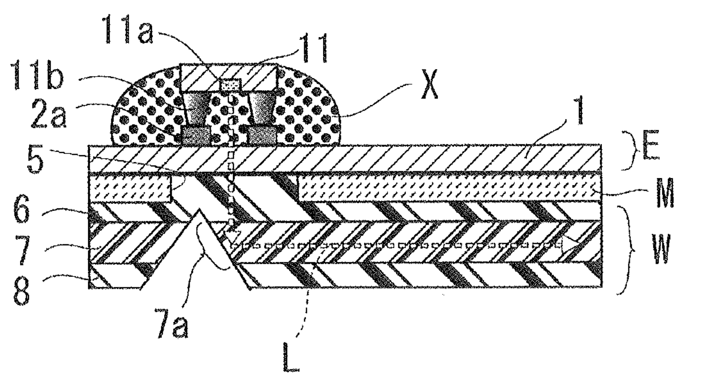
FIG. 1 is a longitudinal sectional view schematically showing an example of the optical module of the present disclosure.

An embodiment of the present disclosure will hereinafter be described in detail. However, it should be understood that the present disclosure be not limited to the embodiment.

As described above, the optical element bonding/reinforcing resin composition of the present disclosure (hereinafter sometimes referred to simply as "resin composition of the present disclosure") is an optical element bonding/reinforcing resin composition to be used in contact with the light emitting portion or the light receiving portion of the optical element while reinforcing the junction between the optical element and the electric circuit board. The optical element bonding/reinforcing resin composition comprises a light-transmissive resin composition which includes a resin component and a curing agent component including only a non-antimony-containing curing agent. In the present disclosure, the term "light-transmissive" means that, where the resin composition is cured and formed into a 100-μm thick film, the film has a light transmittance of not less than 40%, preferably not less than 60%, more preferably not less than 80%, at a wavelength of 400 nm.

As described above, it is herein assumed that the resin composition of the present disclosure is used in contact with the light-emitting portion or the light-receiving portion of the optical element while reinforcing the junction between the optical element and the electric circuit board. Therefore, resin compositions to be used for purposes other than this particular application fall outside the scope of the present disclosure.

The resin composition of the present disclosure is used in contact with the light-emitting portion or the light-receiving portion of the optical element while reinforcing the junction between the optical element and the electric circuit board. Therefore, the resin composition of the present disclosure generally has a thermosetting property or an ultraviolet curable property. In particularly, the resin composition of the present disclosure preferably has both the thermosetting property and the ultraviolet curable property from the viewpoint of more efficient production of the optical module of the present disclosure. These properties are generally dependent on the combination of a resin to be contained as the resin component (base component) and a curing agent to be contained as the curing agent component.

A light-transmissive resin is used as the resin component of the resin composition of the present disclosure. Examples of the light-transmissive resin include epoxy resin, acrylic resin, silicone resin, and urethane resin. These are each used alone, or two or more of these are used in combination. Of these, the epoxy resin is preferred. Further, the resin composition of the present disclosure is typically liquid having fluidity at a room temperature (at 25° C.) and, if necessary, is diluted with an organic solvent. The resin component of the resin composition of the present disclosure preferably contains the epoxy resin in a proportion of not less than 50 wt. %, more preferably not less than 65 wt. %, still more preferably not less than 80 wt. %.

Where the epoxy resin is used in combination with a phosphorus-containing curing agent and/or a boron-containing curing agent, for example, the resulting resin composition has both the thermosetting property and the ultraviolet curable property. Where the epoxy resin is used in combination with an amine curing agent, the resulting resin composition has only the thermosetting property. Therefore, where the amine curing agent is used as the curing agent component, it is preferred to use the acrylic resin together with the epoxy resin as the resin component in order to impart the resin composition with both the thermosetting property and the ultraviolet curable property. Where the acrylic resin is used together with the epoxy resin, the proportion of the acrylic resin is preferably 5 to 50 wt. %, more preferably 10 to 25 wt. %, based on the overall amount of the resin component.

Examples of the epoxy resin include bisphenol epoxy resin, alicyclic epoxy resin, and novolak epoxy resin. These are each used alone, or two or more of these are used in combination. Of these, the bisphenol epoxy resin and the alicyclic epoxy resin are preferred. The epoxy resin to be generally used has an epoxy equivalent of 100 to 1,000 and a softening point of not higher than 120° C. The proportion of the bisphenol epoxy resin and/or the alicyclic epoxy resin is preferably not less than 50 wt. % based on the overall amount of the epoxy resin.

The non-antimony-containing curing agent is used alone as the curing agent component of the resin composition of the present disclosure. In the present disclosure, the term “curing agent component” means to encompass a curing accelerator in addition to so-called curing agents (polymerization initiators) such as thermosetting agent and ultraviolet curing agent.

Examples of the non-antimony-containing curing agent include phosphorus-containing curing agent, boron-containing curing agent, amine curing agent, acid anhydride curing agent, and phenol curing agent. These are each used alone, or two or more of these are used in combination.

Where the resin component includes the acrylic resin, it is preferred to use a radical polymerization initiator. Examples of the radical polymerization initiator include phosphorus-containing curing agent, phenone curing agent, ester curing agent, peroxide curing agent, nitrogen-containing curing agent, and sulfur curing agent. These are each used alone, or two or more of these are used in combination.

Examples of the phosphorus-containing curing agent include triarylsulfonium salt of phosphorus-containing anion (CPI-200K available from San-Apro Ltd.) and benzylmethyl-p-methoxycarbonyloxyphenylsulfonium hexafluorophosphate salt (SAN-AID SI-300 available from Sanshin Chemical Industry Co., Ltd.) These are each used alone and in combination.

Examples of the boron-containing curing agent include triarylsulfonium borate salt (CPI-310B available from San-Apro Ltd.) and benzylmethyl-p-hydroxyphenylsulfonium borate salt (SAN-AID SI-B3 available from Sanshin Chemical Industry Co., Ltd.) These are each used alone and in combination.

Examples of the amine curing agent include tertiary amines (JER CURE 3010 available from Mitsubishi Chemical Corporation), modified aliphatic amines (JER CURE T, TO184, U, 3012PF, 3050, and XD580 available from Mitsubishi Chemical Corporation), modified alicyclic amines (JER CURE 113 and WA available from Mitsubishi Chemical Corporation), ketimines (JER CURE H3 and H30 available from Mitsubishi Chemical Corporation), and imidazoles (JER CURE IBMI12, P200, and H50 available from Mitsubishi Chemical Corporation). These are each used alone, or two or more of these are used in combination. Of these, the modified alicyclic amines are preferred. Particularly, JER CURE WA available from Mitsubishi Chemical Corporation is preferred because it is highly transparent and is capable of curing the resin with a small addition amount.

The proportion of the curing agent component is preferably in a range of 3 to 60 parts by weight, more preferably 5 to 45 parts by weight, more preferably 5 to 30 parts by weight, based on 100 parts by weight of the resin component (base component).

The resin composition of the present disclosure is light-transmissive, and is free from any antimony compound. As described above, the resin composition of the present disclosure includes the resin component and the curing agent component and, as required, may additionally optionally contain curing catalyst, dye, modifier, discoloration inhibitor, antiaging agent, release agent, reactive or non-reactive diluent, and the like.

The resin composition of the present disclosure can be prepared, for example, by blending and mixing the resin component, the curing agent component, and the like and, as required, kneading or melt-kneading the resulting mixture by means of a kneading machine.

The optical module of the present disclosure can be produced by using the resin composition of the present disclosure thus prepared.

The optical module of the present disclosure is an optical module including an electric circuit board, an optical element joined onto the electric circuit board, and an optical element bonding/reinforcing resin cured product provided in contact with a light emitting portion or a light receiving portion of the optical element while reinforcing a junction between the optical element and the electric circuit board. The optical element bonding/reinforcing resin cured product is a cured product of the resin composition of the present disclosure.

Figure 2:
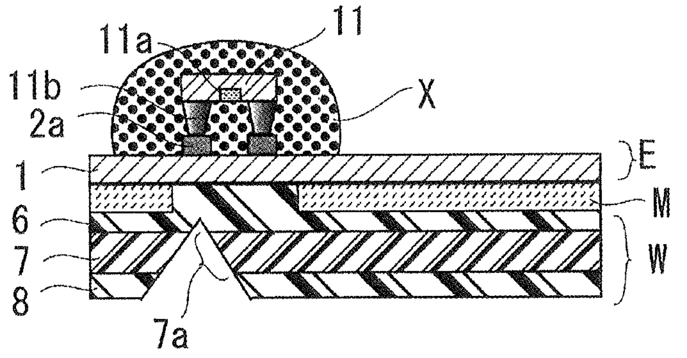
FIG. 2 is a longitudinal sectional view schematically showing another example of the optical module of the present disclosure.
Figure 3:
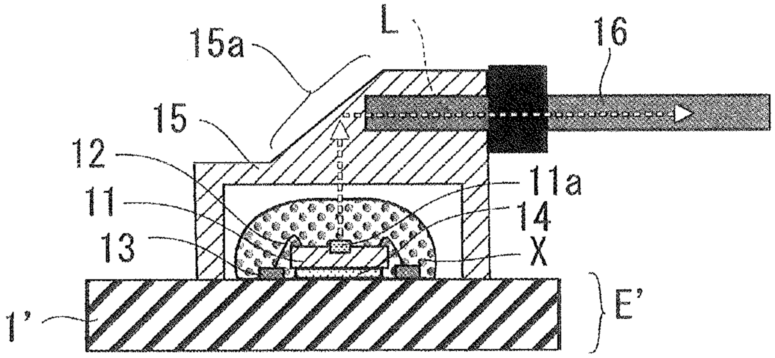
FIG. 3 is a longitudinal sectional view schematically showing further another example of the optical module of the present disclosure.

The optical module is provided in any of exemplary forms shown in FIGS. 1 to 3.

Specifically, FIGS. 1 and 2 show exemplary optical modules (opto-electric hybrid boards) in which the optical element is joined onto the electric circuit board with the light emitting portion or the light receiving portion thereof facing toward the electric circuit board and the optical element bonding/reinforcing resin cured product serves as an underfill for the optical element. FIG. 3 shows an exemplary optical module in which the optical element is joined onto the electric circuit board with the light emitting portion or the light receiving portion thereof facing away from the electric circuit board and the optical element bonding/reinforcing resin cured product serves as an encapsulant for the optical element.

In FIGS. 1 and 2, reference numerals 11, 11*a*, and 11*b* denote the optical element, the light emitting portion (or the light receiving portion), and bumps, respectively. As shown, the optical element 11 is mounted on the electric circuit board E so as to be connected to an electric circuit of the electric circuit board E via the bumps 11*b* and mounting pads 2*a* with the light emitting portion (or the light receiving portion) 11*a* thereof facing toward the electric circuit board E. The electric circuit board E is configured such that the electric circuit (not shown) and the mounting pads 2*a* are provided on the surface of a light-transmissive insulating layer 1.

A space between the light emitting portion (or the light receiving portion) 11*a* of the optical element 11 and the insulating layer 1 of the electric circuit board E is filled with the cured product of the resin composition of the present disclosure prepared in the aforementioned manner (optical element bonding/reinforcing resin cured product X). As shown, the optical element bonding/reinforcing resin cured product X is provided in contact with the light emitting portion (or the light receiving portion) 11*a* of the optical element 11 while reinforcing the junction between the optical element 11 and the electric circuit board E.

In this embodiment, the optical module includes an optical waveguide W which includes a core 7 optically coupled to the light emitting portion (or the light receiving portion) 11*a* of the optical element 11 via the optical element bonding/reinforcing resin cured product X and the insulating layer 1. The optical waveguide W includes a first cladding layer 6, the core 7, and a second cladding layer 8 laminated together. As shown, the optical waveguide W has a tilt surface tilted by 45 degrees with respect to the length of the core 7 at one of opposite end portions thereof in association with the optical element 11, and a core portion located on the tilt surface serves as a light reflection surface 7*a*. With this arrangement, the light emitting portion (or the light receiving portion) 11*a* of the optical element 11 is optically coupled to the core 7. Where the reference numeral 11*a* denotes the light emitting portion, an optical signal L is transmitted through the core 7 of the optical waveguide W in an arrow direction shown in FIG. 1. Where the reference numeral 11*a* denotes the light receiving portion, the optical signal L is transmitted in a direction opposite to the arrow direction shown in FIG. 1.

In this embodiment, a reinforcing metal layer M is provided between the electric circuit board E and the optical waveguide W. The metal layer M is formed with a through-hole 5 so as not to interfere with the optical signal L to be outputted from (or inputted to) the light-emitting portion (or the light-receiving portion) 11*a* of the optical element 11, and the first cladding layer 6 intrudes into the through-hole 5 to fill the through-hole 5.

FIG. 2 shows a modification of FIG. 1, in which the optical element bonding/reinforcing resin cured product X serves not only as the underfill for the optical element 11 but also as a mold that encapsulates the entire optical element 11. The optical element 11 is thus entirely encapsulated to be thereby improved in optical element bonding/reinforcing property and durability and hence reliability.

In FIG. 3, the optical element 11 is bonded to an electric circuit board E' via an adhesive layer 14 with the light emitting portion (or the light receiving portion) 11*a* thereof facing away from the electric circuit board E'. The optical element 11 is mounted on the electric circuit board E' to be connected to an electric circuit of the electric circuit board E' via wires 12 and connection terminals 13. The cured product of the resin composition of the present disclosure prepared in the aforementioned manner (optical element bonding/reinforcing resin cured product X) serves as an encapsulant for the optical element 11 thus mounted. As shown, the optical element bonding/reinforcing resin cured product X is provided in contact with the light emitting portion (or the light receiving portion) 11*a* of the optical element 11 while reinforcing the junction between the optical element 11 and the electric circuit board E'.

The electric circuit board E' includes the electric circuit (not shown) and the connection terminals 13 provided on the surface of the insulating layer 1'. The insulating layer 1' does not have to be light-transmissive.

In this embodiment, as shown in FIG. 3, a lens 15 and an optical fiber 16 are provided in the optical module. The lens 15 is partly formed into a tilt surface (light reflection surface 15*a*) tilted by 45 degrees with respect to the optical path of the light emitting portion (or the light receiving portion) 11*a* of the optical element 11. With this arrangement, the light emitting portion (or the light receiving portion) 11*a* of the optical element 11 is optically coupled to the optical fiber 16 via the optical element bonding/reinforcing resin cured product X and the lens 15, whereby the optical signal of the optical element 11 is transmitted through the optical fiber 16. Where the reference numeral 11*a* denotes the light emitting portion, the optical signal L is transmitted through the optical fiber 16 in an arrow direction shown in FIG. 3. Where the reference numeral 11*a* denotes the light receiving portion, the optical signal L is transmitted in a direction opposite to the arrow direction shown in FIG. 3.

A method for underfilling or encapsulating the optical element with the use of the resin composition of the present disclosure is not particularly limited, but examples of the method include ordinary transfer forming method, and known molding method such as casting method.

Figure 4A:
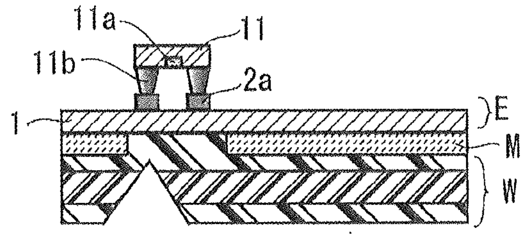
FIGS. 4A to 4D are explanatory diagrams schematically showing a process for producing the optical module of the present disclosure.
Figure 4B:
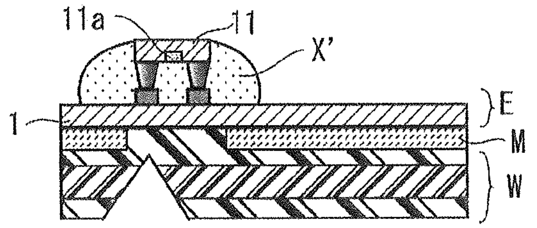
Figure 4C:
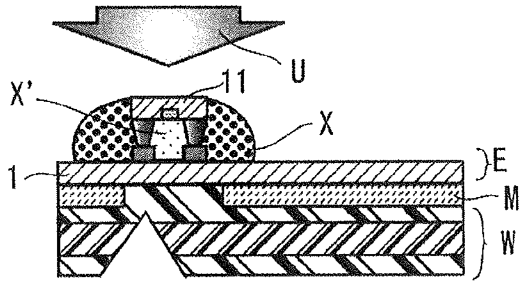
Figure 4D:
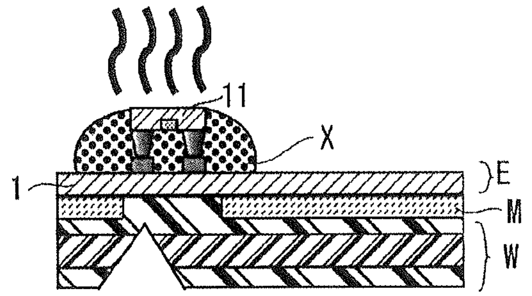
Figure 5:
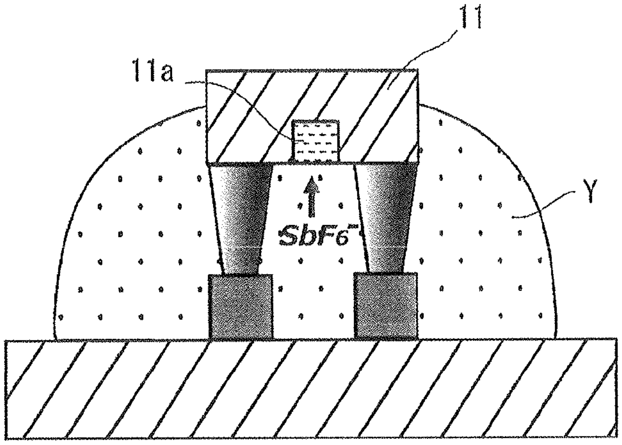
FIG. 5 is an explanatory diagram schematically showing a phenomenon occurring when a conventional optical element bonding/reinforcing resin composition is used.

FIGS. 4A to 4D schematically show an exemplary process for producing the optical module of the present disclosure (the optical module shown in FIG. 1). The process includes steps shown in FIGS. 4A to 4D, which are performed in this order. That is, an optical element 11 is first mounted on an electric circuit board E as shown in FIG. 4A, and then the resin composition of the present disclosure (underfill material X') is applied on the electric circuit board E as shown in FIG. 4B. The application of the underfill material X' is achieved with the use of a syringe or the like. Then, the underfill material X' is partly cured for temporarily fixing the optical element 11 by irradiation with UV (ultraviolet radiation) applied thereto in an arrow direction U shown in FIG. 4C. Thereafter, as shown in FIG. 4D, an uncured part of the underfill material X' (a part of the underfill material X' not irradiated with the UV) is thermoset with heating, whereby a completely cured product (optical element bonding/reinforcing resin cured product X) is provided. Thus, the optical element 11 is firmly fixed to the electric circuit board E.

The UV-curing of the resin composition of the present disclosure is preferably achieved by ultraviolet irradiation at 4,000 to 30,000 mJ/cm$^2$, more preferably at 12,000 to 24,000 mJ/cm$^2$, by means of a UV irradiation apparatus. The thermosetting of the resin composition of the present disclosure is preferably achieved with heating at 25° C. to 150° C. for 10 to 180 minutes, more preferably at 80° C. to 120° C. for 30 to 120 minutes, in an oven.

Where the optical module is produced by the aforementioned process, the resin composition of the present disclosure (underfill material X') preferably has both the thermosetting property and the ultraviolet curable property.

The temporary fixing step described above may be omitted, but is preferably performed for improvement of the yield.

[Formation of Electric Circuit Board E]

For formation of the electric circuit board E shown in FIGS. 1 and 2, a metal sheet material for formation of a metal layer M is first prepared. Exemplary metal sheet forming materials include stainless steel and 42-alloy. Particularly, the stainless steel is preferred from the viewpoint of dimensional accuracy and the like. The thickness of the metal sheet material (metal layer M) is set, for example, in a range of 10 to 100 μm.

Then, a photosensitive insulating resin is applied over the surface of the metal sheet material, and an insulating layer 1 is formed as having a predetermined pattern by a photolithography method. Exemplary materials for forming the insulating layer 1 include synthetic resins such as polyimide, polyethernitrile, polyethersulfone, polyethylene terephthalate, polyethylene naphthalate, and polyvinyl chloride, and silicone sol-gel material. The thickness of the insulating layer 1 is set, for example, in a range of 10 to 100 μm.

Next, electric wirings (not shown) and mounting pads 2*a* are formed on the insulating layer 1, for example, by a semi-additive method, a subtractive method or the like In general, a photosensitive insulating resin such as polyimide resin is applied onto the electric wirings, and a coverlay is formed by a photolithography method. Thus, the electric circuit board E is formed on the surface of the metal sheet material.

Thereafter, the metal sheet material is etched to be formed with a through-hole 5 to provide the metal layer M.

[Formation of Optical Waveguide W]

Further, where the optical waveguide W is formed on the back surface of the stack of the electric circuit board E and the metal layer M as shown in FIGS. 1 and 2, a photosensitive resin as a first cladding layer formation material is applied onto the back surface (the lower surface in FIGS. 1 and 2) of the stack, and a first cladding layer 6 is formed by a photolithography method. As shown, the first cladding layer 6 is formed as filling the through-hole 5 of the metal layer M. The thickness of the first cladding layer 6 (as measured from the back surface of the metal layer M) is set, for example, in a range of 5 to 80 μm. During the formation of the optical waveguide W (during the formation of the first cladding layer 6, and a core 7 and a second cladding layer 8 to be described later), the back surface of the stack faces upward.

Subsequently, a photosensitive resin as a core formation material is applied on the surface (the lower surface in FIGS. 1 and 2) of the first cladding layer 6, and the core 7 is formed as having a predetermined pattern by a photolithography method. The core 7 is dimensioned to have a width of 20 to 100 μm, a thickness of 20 to 100 μm, and a length of 0.5 to 100 cm.

Then, a second cladding layer formation material is applied on the surface (the lower surface in FIGS. 1 and 2) of the first cladding layer 6 as covering the core 7, and the second cladding layer 8 is formed by a photolithography method. The thickness of the second cladding layer 8 (as measured from the interface between the core 7 and the second cladding layer 8) is set, for example, in a range of 3 to 50 μm. The second cladding layer material is, for example, the same photosensitive resin as the first cladding layer material.

Thereafter, the optical waveguide W formed in the aforementioned manner is formed with a tilt surface (light reflection surface 7*a*) tiled by 45 degrees with respect to the length of the core 7, for example, by a laser processing method or the like. Thus, the optical waveguide W is formed on the back surface of the metal layer M.

The photosensitive resins for the first cladding layer 6, the core 7, and the second cladding layer 8 are prepared so that the refractive index of the core 7 is greater than the refractive indexes of the first cladding layer 6 and the second cladding layer 8.

The optical module of the present disclosure can be used for optical transceiver, AOC (Active Optical Cable), and private use AOC such as of QSFP (Quad Small Form Factor Pluggable) and OSFP (Octal Small Form Factor Pluggable) which are optical communication interface standards, and for internal wirings and the like of smartphone, tablet, PC (Personal Computer), and other electrical appliances.

EXAMPLES

The embodiment of the present disclosure will hereinafter be described by way of examples in conjunction with comparative example. However, it should be understood that the present disclosure be not limited to these examples within the scope of the present disclosure.

Example 1

A light-transmissive resin composition (underfill material) was prepared by preliminarily mixing 100 parts by weight of an epoxy resin (JER828 available from Mitsubishi Chemical Corporation), and a phosphorus-containing curing agent (including 2 parts by weight of CPI-200K available from San-Apro Ltd. and 4 parts by weight of SAN-AID SI-300 available from Sanshin Chemical Industry Co., Ltd.), kneading and melt-kneading the resulting mixture by a kneading machine, and cooling the mixture to 23° C.

With the use of the above resin composition, an optical module was produced through the steps shown in FIGS. 4A to 4D. Specifically, an optical element 11 was first mounted on an electric circuit board E as shown in FIG. 4A, and then the resin composition (underfill material X') prepared in the aforementioned manner was applied on the electric circuit board E as shown in FIG. 4B. Subsequently, the underfill material X' was irradiated with UV (ultraviolet radiation) at 12,000 mJ/cm$^2$ by a spot UV irradiation device (SP-9 available from Ushio Inc.) as shown in FIG. 4C to be thereby partly cured. Thus, the optical element 11 was temporarily fixed to the electric circuit board E. Thereafter, the underfill material X' was thermoset as shown in FIG. 4D with heating at 100° C. for 60 minutes in an oven. Thus, the underfill material X' was completely cured (into an optical element bonding/reinforcing resin cured product X), whereby the optical element 11 was firmly fixed to the electric circuit board E.

Example 2

A light-transmissive resin composition (underfill material) was prepared by preliminarily mixing 100 parts by weight of an epoxy resin (JER828 available from Mitsubishi Chemical Corporation), and a boron-containing curing agent (Including 2 parts by weight of CPI-310B available from San-Apro Ltd. and 4 parts by weight of SAN-AID SI-B3 available from Sanshin Chemical Industry Co., Ltd.), kneading and melt-kneading the resulting mixture by a kneading machine, and cooling the mixture to a room temperature.

Then, an optical module was produced in substantially the same manner as in Example 1, except that the light-transmissive resin composition thus prepared was used instead of the light-transmissive resin composition of Example 1.

Example 3

A light-transmissive resin composition (underfill material) was prepared by preliminarily mixing 100 parts by weight of an epoxy resin (JER828 available from Mitsubishi Chemical Corporation) and 25 parts by weight of an amine curing agent (JER CURE WA available from Mitsubishi Chemical Corporation), kneading and melt-kneading the resulting mixture by a kneading machine, and cooling the mixture to a room temperature.

Then, an optical module was produced in substantially the same manner as in Example 1, except that the light-transmissive resin composition thus prepared was used instead of the light-transmissive resin composition of Example 1 and the UV irradiation step (the step shown in FIG. 4B) was omitted.

Example 4

A light-transmissive resin composition (underfill material) was prepared by preliminarily mixing 90 parts by weight of an epoxy resin (JER828 available from Mitsubishi Chemical Corporation), an acrylic resin (ABE-400 available from Shin-Nakamura Chemical Co., Ltd.), 22.5 parts by weight of an amine curing agent (JER CURE WA available from Mitsubishi Chemical Corporation), and 0.2 parts by weight of a radical initiator (IRGACURE 819 available from BASF Japan Ltd.), kneading and melt-kneading the resulting mixture by a kneading machine, and cooling the mixture to a room temperature.

Then, an optical module was produced in substantially the same manner as in Example 1, except that the light-transmissive resin composition thus prepared was used instead of the light-transmissive resin composition of Example 1.

Comparative Example 1

A light-transmissive resin composition (underfill material) was prepared by preliminarily mixing 100 parts by weight of an epoxy resin (JER828 available from Mitsubishi Chemical Corporation) and an antimony-containing curing agent (including 2 parts by weight of CPI-101A available from San-Apro Ltd. and 4 parts by weight of SAN-AID SI-60 available from Sanshin Chemical Industry Co., Ltd.), kneading and melt-kneading the resulting mixture by a kneading machine, and cooling the mixture to a room temperature.

Then, an optical module was produced in substantially the same manner as in Example 1, except that the light-transmissive resin composition thus prepared was used instead of the light-transmissive resin composition of Example 1 and the UV irradiation step (the step shown in FIG. 4B) was omitted.

<Blackening>

The optical modules thus produced were each energized at 10 mA and, in this state, maintained in an environment at 85° C. at 85% RH for 500 hours. Thereafter, the optical modules were each visually checked for blackening occurring due to segregation attributable to the curing agent contained in the resin composition (underfill material), and evaluated based on the following criteria.

- ○ (very good): The blackening due to the segregation attributable to the curing agent was not observed at all.
- Δ (good): The blackening due to the segregation attributable to the curing agent was observed to such an extent as not to influence the output reduction of the optical module.
- x (poor): The blackening due to the segregation attributable to the curing agent was observed to such an extent as to influence the output reduction of the optical module.

TABLE 1

| | Base resin | Curing agent | Curing process | Blackening |
|---|---|---|---|---|
| Example 1 | Epoxy resin | Phosphorus | UV, heat | Δ |
| Example 2 | Epoxy resin | Boron | UV, heat | Δ |
| Example 3 | Epoxy resin | Amine | Heat | ○ |
| Example 4 | Epoxy resin/ Acrylic resin | Amine | UV, heat | ○ |
| Comparative Example 1 | Epoxy resin | Antimony | Heat | x |

The results shown in Table 1 indicate that the optical modules of Examples were each substantially free from the blackening of the underfill after the prolonged use and hence free from the possibility of the output reduction. In contrast, the optical module of Comparative Example suffered from the blackening of the underfill after the prolonged use and hence suffered from the possibility of the output reduction.

Where the light-transmissive resin compositions of Examples and Comparative Example were each used as an encapsulation material for an optical element (see FIG. 3), the results were substantially the same as those described above for Examples and Comparative Example.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The optical module of the present disclosure can be used for optical transceiver, AOC (Active Optical Cable), and private use AOC such as of QSFP (Quad Small Form Factor Pluggable) and OSFP (Octal Small Form Factor Pluggable) which are optical communication interface standards, and for internal wirings and the like of smartphone, tablet, PC (Personal Computer), and other electrical appliances.

REFERENCE SIGNS LIST

E: Electric circuit board
X: Optical element bonding/reinforcing resin cured product
1: Insulating layer
11: Optical element
11*a*: Light emitting portion (or light receiving portion)

The invention claimed is:

1. An optical module comprising:
an electric circuit board;
an optical element joined onto the electric circuit board; and
an optical element bonding and reinforcing resin cured product provided in contact with a light-emitting portion or a light-receiving portion of the optical element while reinforcing a junction between the optical element and the electric circuit board;
wherein the optical element bonding and reinforcing resin cured product is a cured product of an optical element bonding and reinforcing resin composition comprising a light-transmissive resin composition which comprises a resin component and a curing agent component including only a non-antimony-containing curing agent,
wherein a proportion of the non-antimony-containing curing agent is in a range of 3 to 30 parts by weight based on 100 parts by weight of the resin component,
wherein the non-antimony-containing curing agent comprises a curing agent selected from the group consisting of a phosphorus-containing curing agent, a boron-containing curing agent, and a modified aliphatic amine curing agent, and
wherein the optical element is joined onto the electric circuit board with the light-emitting portion or the light-receiving portion thereof facing toward the electric circuit board, the optical element bonding and reinforcing resin cured product is provided in direct contact with a whole of a surface of the light-emitting portion or a light-receiving portion of the optical element that is facing toward the electric circuit board, and the optical element bonding and reinforcing resin cured product serves as an underfill for the optical element.

2. An optical module comprising,
an electric circuit board;
an optical element joined onto the electric circuit board;
an optical element bonding and reinforcing resin cured product provided in contact with a light-emitting portion or a light-receiving portion of the optical element while reinforcing a junction between the optical element and the electric circuit board;
a lens; and
an optical fiber;
wherein the optical element bonding and reinforcing resin cured product is a cured product of an optical element bonding and reinforcing resin composition comprising a light-transmissive resin composition which comprises a resin component and a curing agent component including only a non-antimony-containing curing agent,
wherein a proportion of the non-antimony-containing curing agent is in a range of 3 to 30 parts by weight based on 100 parts by weight of the resin component,
wherein the non-antimony-containing curing agent comprises a curing agent selected from the group consisting of a phosphorus-containing curing agent, a boron-containing curing agent, and a modified aliphatic amine curing agent,
wherein the optical element is joined onto the electric circuit board with the light-emitting portion or the light-receiving portion thereof facing away from the electric circuit board, and the optical element bonding and reinforcing resin cured product serves as an encapsulant for the optical element, and
wherein the optical element is optically coupled to the optical fiber via the optical element bonding and reinforcing resin cured product and the lens.

3. The optical module according to claim 1, further comprising an optical waveguide including a core which is optically coupled to the light-emitting portion or the light-receiving portion of the optical element.

4. The optical module according to claim 1, wherein the resin component of the light-transmissive resin composition comprises not less than 50 wt. % of an epoxy resin.

5. The optical module according to claim 1, wherein the resin component of the light-transmissive resin composition further comprises an acrylic resin.

6. The optical module according to claim 1, wherein the light-transmissive resin composition has at least one property selected from the group consisting of an ultraviolet curable property and a thermosetting property.

* * * * *